May 17, 1927.

A. T. STURT ET AL 1,629,234

MOTOR VEHICLE FRAME

Filed April 16, 1921     3 Sheets-Sheet 1

INVENTORS
Alfred T. Sturt
Walter F. Pfander
BY
ATTORNEY

May 17, 1927.

A. T. STURT ET AL 1,629,234

MOTOR VEHICLE FRAME

Filed April 16, 1921

INVENTORS
Alfred T. Sturt
Walter F. Pfander
BY
Cornelius C. Billings
their ATTORNEY Harold Crocheron May 17, 1927. 1,629,234
A. T. STURT ET AL
MOTOR VEHICLE FRAME
Filed April 16, 1921 3 Sheets-Sheet 3
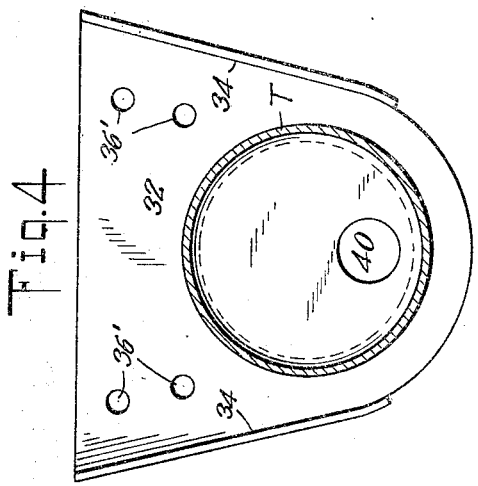
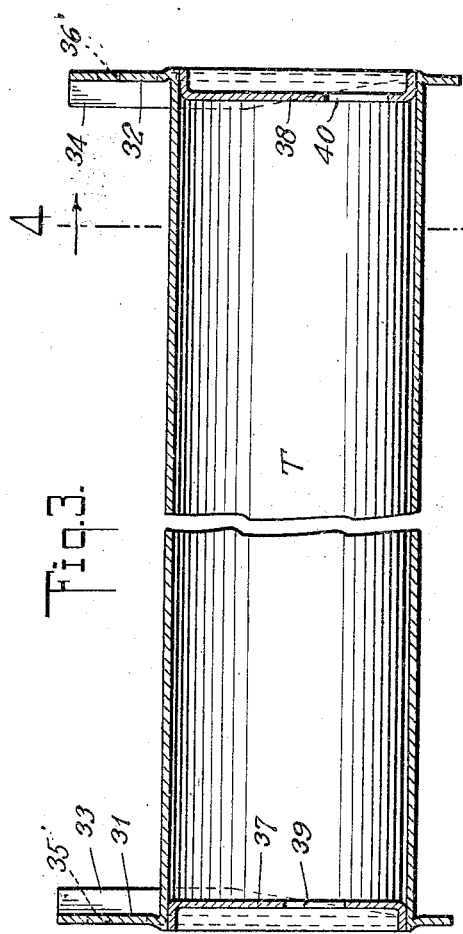
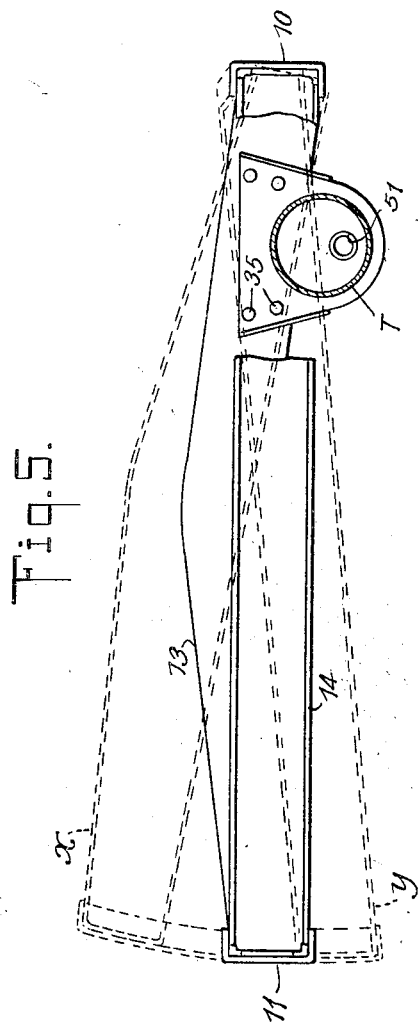
INVENTORS
Alfred T. Sturt
Walter F. Pfander
BY
ATTORNEY Patented May 17, 1927.

1,629,234

UNITED STATES PATENT OFFICE.

ALFRED T. STURT, OF FLINT, MICHIGAN, AND WALTER F. PFANDER, OF YONKERS, NEW YORK, ASSIGNORS TO DURANT MOTORS INCORPORATED, A CORPORATION OF DELAWARE.

MOTOR-VEHICLE FRAME.

Application filed April 16, 1921. Serial No. 461,847.

Our invention relates to means for stiffening motor vehicle frames so that the torsional stresses thereon are effectively counter-acted. The stiffening means comprises a tubular, longitudinal member which is secured to the usual cross members of the frame. Our invention also contemplates the use of this member as a sound-deadening device or "muffler".

The invention will be understood from the following description when read in connection with the accompanying drawing, and the novel features will be particularly pointed out in the appended claims.

In the drawings:

Fig. 3 is a detached detail vertical section through the stiffener.

Fig. 4 is a section on line 4—4 of Fig. 3.

Fig. 5 is a diagrammatic view illustrating our invention in full line, and also showing in dotted lines an exaggerated distortion of a frame, not provided with our invention.

The purpose of the present invention is to place a metal tubular member to counteract this tendency to twist, and to so stiffen the frame that it will be a suitable foundation for the body. The unevenness of the road must be taken on the springs, between the frame and axles, in place of being taken by distortion of the frame and consequent destruction of the body.

The tube is of relatively large diameter and of thin, or sheet, material in order to keep the weight of material low in proportion to the stiffening effect and also to eliminate difficulties in construction that would be encountered if pipes or tubes of the dimensions of the common pipe material were used.

Figure 1:
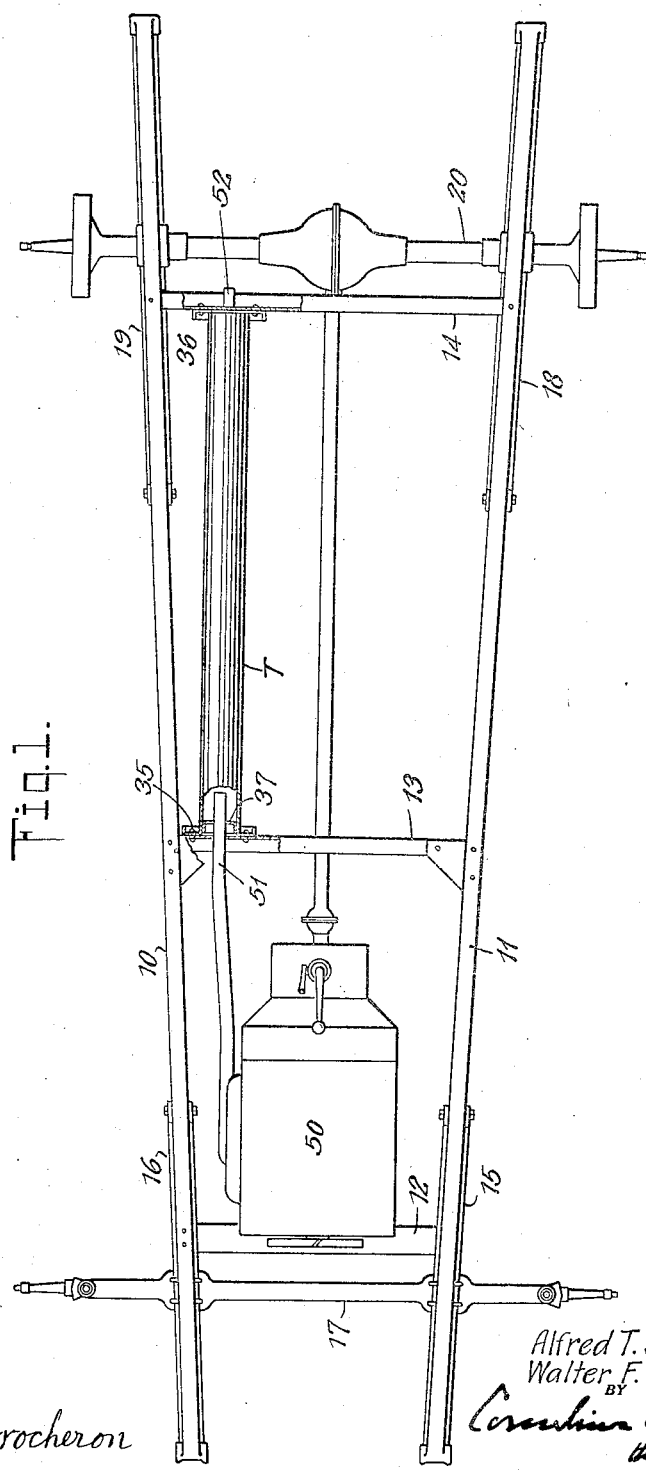
Fig. 1 is a plan view of an automobile chassis or frame illustrating one embodiment of the invention.
Figure 2:
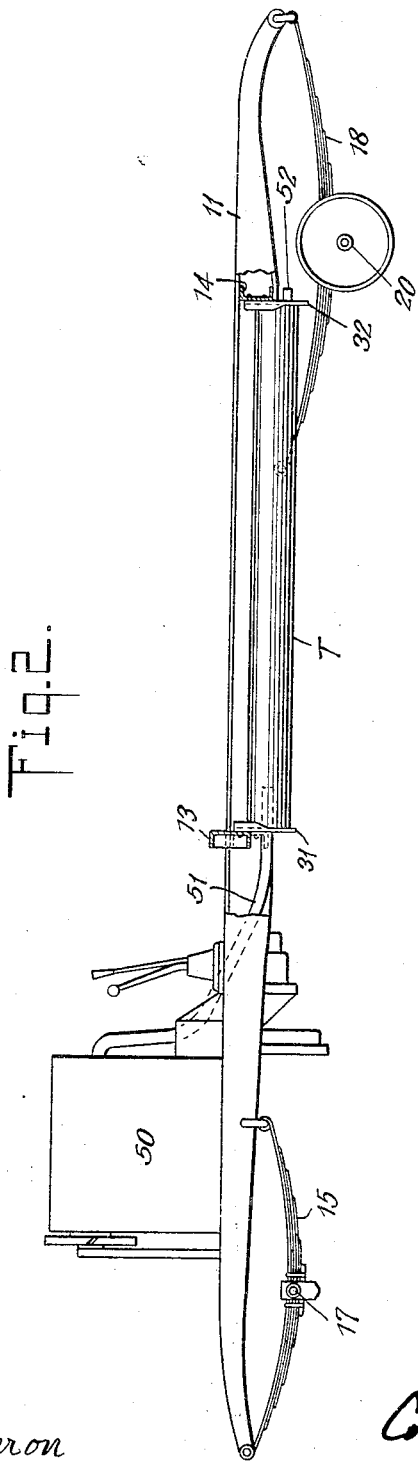
Fig. 2 is a side view of Fig. 1 with parts broken away and parts shown in section in the interest of clearness.

Referring first to Figs. 1 and 2, the frame or chassis comprises the usual longitudinal or chassis side members 10 and 11 and transverse cross members 12, 13, and 14 riveted or otherwise secured thereto. The frame is suitably supported in the front on springs 15 and 16 which are connected to the front axle 17 and in the back by springs 18 and 19 connected to the rear axle housing 20.

In the construction of frames heretofore made torsional strengthening means have always been lacking. The usual channel shaped sections used for side and cross members are of ample strength to counter-act vertically and horizontally applied forces or loads and also fore and aft stresses, but in the frames heretofore made there have been no members of sufficient torsional resistance to prevent the twisting or warping of the chassis as the car travels over rough roads.

This distortion or warping of frames of prior constructions, not provided with our invention, is illustrated by the dotted lines in Fig. 5. This shows a rear view in full lines, and the dotted lines X show the deflection when the right side and the rear of the frame is held firm and the front left end is raised. The dotted lines Y show the deflections when the rear left end is depressed.

To overcome this tendency of the frames to deflect we place an auxiliary member in the frame to counteract the torsional strains. The unevenness of the road therefore must be compensated for by the springs between the frame and axles and not by the distortion of the frame. Our frame therefore forms a substantially rigid foundation for the car body and will therefore not transmit strains thereto.

In the embodiment shown the stiffener comprises a torsion tube T which has welded or otherwise similarly secured thereto to provide an immovable juncture, the connecting plates 31 and 32 which are formed with reinforcing flanges 33, 34. The tube is secured to the cross members 13 and 14 by rivets 35, 36 which pass through suitable holes 35' and 36' in the plates 31 and 32.

The provision of this auxiliary member which acts as a strengthening "backbone" rigidly holds the torsional members to which it is secured in true parallel relation through the high torsional resistance of its cylindrical or tubular form, and consequently also holds the longitudinal members in fixed substantially parallel relation to each other.

The torsional member T being hollow and being properly situated for the purpose can also be effectively used as a sound deadening device or muffler for the engine 50. When this use is made of the member, heads 37 and 38 are secured in the ends of the tube, these heads being formed with openings 39 and 40 for reception of the exhaust pipe 51 from the engine and the final exhaust or tail pipe 52 respectively, as shown in Fig. 1. Suitable sound deadening devices can be placed inside the tube if desired, or left out entirely.

The construction is not confined to the attachment of heads to a tube and the heads in turn attached to cross-members. The same result would be obtained if the cross-members were the heads and were welded to the ends of the tube.

While we have described with great particularity the detail of the embodiment of the invention shown, it is not to be construed that we are limited thereto as changes and substitution of equivalents may be made without departing from the spirit and scope of the invention as defined in the appended claims.

Having thus described our invention what we claim as new and desire to secure by Letters Patent is:

1. A motor vehicle frame having longitudinal side members, transverse members secured thereto, and an auxiliary member mounted on said transverse members to resist the twisting stresses exerted on the frame comprising a sheet metal shell of circular cross section having connecting plates welded on each end for securing it to said transverse members.

2. A motor vehicle frame having longitudinal side members, transverse cross members and a longitudinally extending shell secured to said cross members to resist the twisting stresses exerted on the frame, said shell forming part of a sound deadening device.

3. In combination with the side and cross members of a motor vehicle frame, and the engine carried thereby, a longitudinal tubular member secured to said cross members and having heads secured near the ends thereof to form a closed muffler chamber, means for conveying the exhaust gases from the engine to one end of said chamber and means for exhausting the gases from the opposite end of said chamber.

4. In combination, a chassis frame including side bars and cross members, a hollow brace member secured to the cross members of said frame and provided with an opening in its forward end, and an exhaust pipe secured in said opening, said brace member being also provided with means through which the exhaust may be discharged, substantially as shown and described.

Signed at New York, N. Y., this 15th day of April, 1921.

ALFRED T. STURT.
WALTER F. PFANDER.